US012811737B2

(12) United States Patent
Zhang et al.

(10) Patent No.: US 12,811,737 B2
(45) Date of Patent: Nov. 24, 2026

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Shichang Zhang, Dongguan (CN); Teng Ma, Dongguan (CN); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 201 days.

(21) Appl. No.: 18/424,731

(22) Filed: Jan. 26, 2024

(65) Prior Publication Data

US 2024/0163045 A1 May 16, 2024

Related U.S. Application Data

(63) Continuation of application No. PCT/CN2021/108660, filed on Jul. 27, 2021.

(51) Int. Cl.
*H04L 5/00* (2006.01)
*H04W 48/12* (2009.01)

(52) U.S. Cl.
CPC ........... *H04L 5/0048* (2013.01); *H04W 48/12* (2013.01)

(58) Field of Classification Search
CPC ............................. H04W 48/12; H04L 5/0048
See application file for complete search history.

(56) References Cited

U.S. PATENT DOCUMENTS

2017/0188341 A1* 6/2017 Tan ......................... H04W 4/06
2018/0270865 A1 9/2018 Mallick et al.
2019/0349142 A1* 11/2019 Aiba ..................... H04L 1/1819
2019/0387501 A1* 12/2019 Park ......................... H04L 5/005
2020/0053732 A1* 2/2020 Ren ................... H04W 72/0446
2020/0280995 A1* 9/2020 Ma ......................... H04L 5/0053
2021/0029772 A1* 1/2021 Islam .................... H04L 1/1896
2021/0153228 A1 5/2021 Shi et al.
(Continued)

FOREIGN PATENT DOCUMENTS

CA 3110929 A1 * 3/2020 .......... H04W 52/143
CN 108024340 A 5/2018
(Continued)

OTHER PUBLICATIONS

Supplementary European Search Report in the corresponding European patent application No. 21951200.1, mailed on Oct. 17, 2024.
(Continued)

*Primary Examiner* — Brian J. Gillis
(74) *Attorney, Agent, or Firm* — Ladas & Parry, LLP

(57) ABSTRACT

A method for wireless communication includes: a terminal device detects, in a first search space, a PDCCH scrambled by at least one Group Radio Network Temporary Identifier (G-RNTI), where the first search space includes at least one of a Common Search Space (CSS) or a User Equipment (UE) specific Search Space (USS), and a number of types of bit numbers of Downlink Control Information (DCI) carried by the PDCCH scrambled by the at least one G-RNTI is less than or equal to a first threshold.

20 Claims, 5 Drawing Sheets

(56) References Cited

U.S. PATENT DOCUMENTS

| | | | | |
|---|---|---|---|---|
| 2023/0006797 | A1 * | 1/2023 | Hu | H04L 5/0053 |
| 2024/0073922 | A1 * | 2/2024 | Li | H04L 1/0038 |

FOREIGN PATENT DOCUMENTS

| | | | | | |
|---|---|---|---|---|---|
| CN | 109802755 | A | | 5/2019 | |
| CN | 111262675 | A | | 6/2020 | |
| CN | 111867097 | A | | 10/2020 | |
| EP | 3949632 | A1 | | 2/2022 | |
| WO | WO-2020085991 | A1 | * | 4/2020 | H04L 5/0053 |
| WO | 2020222574 | A1 | | 5/2020 | |
| WO | 2020252708 | A1 | | 12/2020 | |
| WO | WO-2021097605 | A1 | * | 5/2021 | H04L 1/18 |
| WO | 2023004584 | A1 | | 2/2023 | |

OTHER PUBLICATIONS

Ericsson: "Mechanisms to support MBS group scheduling for RRC_Connected UEs", 3GPP Draft;R1-2101726, 3rd Generation Partnership Project (3GPP), Mobile Competence Centre; 650, Route Des Lucioles; F-06921 Sophia-Antipolis Cedex; France, vol. RAN WG1, No. eMeeting; Jan. 25, 2021-Feb. 5, 2021 Jan. 19, 2021 (Jan. 19, 2021), XP051971877, figure x, sections 2.1.1-2.1.3, 2.2.1, 2.3, 2.4.2, 2.4.3, 2.5.2, 2.5.4.

Mediatek Inc: "Discussion on NR MBS group scheduling for RRC_Connected UEs", 3GPP Drapt; R1-2102702, 3rd Generation, Partnership Project (3GPP), Mobile Competence Centre; 650, Route Des Lucioles; F-06921 Sophia-Antipolis Cedex; France, vol. RAN WG1, No. e-Meeting; Apr. 12, 2021-Apr. 20, 2021 Apr. 7, 2021 (Apr. 7, 2021), XP052177707, sections 2.1, 2.3-2.5.

CMCC: "Discussion on group scheduling mechanisms", 3GPP Draft; R1-2102900, 3rd Generation Partnership Project (3GPP), Mobile Competence Centre; 650, Route Des Lucioles; F-06921 Sophia-Antipolis Cedex, France, vol. RAN WG1, No. e-Meeting; Apr. 12, 2021-Apr. 20, 2021 Apr. 6, 2021 (Apr. 6, 2021), XP051993282, sections 2.2, 2.3, 3.2, 4.1.

Ericsson: "PDCCH enhancements for NR URLLC", 3GPP Draft; R1-1900158 PDCCH Enhancements for URLLC, 3rd Generation Partnership Project (3GPP), Mobile Competence Centre; 650, Route Des Lucioles; F-06921 Sophia-Antipolis Cedex; France vol. RAN WG1, No. Taipei, Taiwan; Jan. 21, 2019-Jan. 25, 2019 Jan. 20, 2019 (Jan. 20, 2019), XP051593084, sections 1, 2.1, 2.2.2, 2.3.2, 2.3.3.

Kucera Stepan et al: "C-RNTI management for orthogonally-filled subframes in LTE heterogeneous networks", 2015 IEEE International Conference on Communications (ICC), IEEE, Jun. 8, 2015 (Jun. 8, 2015), pp. 1483-1488, XP033198649, DOI: 10.1109/ICC2015.7248533, sections I, II, IV.

Takeda Kazuki et al: "Understanding the Heart of the 5G Air Interface: An Overview of Physical Downlink Control Channel for 5G New Radio", IEEE Communications Standards Magazine, IEEE, vol. 4, No. 3, Sep. 23, 2020 (Sep. 23, 2020), pp. 22-29, XP011810635, ISSN: 2471-2825, DOI: 10.1109/MCOMSTD.001.1900048, p. 23, left-hand column; p. 24, right-hand column—p. 25, right-hand column; p. 26, left-hand column.

Nokia et al: "Group scheduling Mechanisms to Support 5G Multicast / Broadcast Services for RRC_Connected UEs", 3GPP Draft; R1-2008882, 3rd Generation Partnership Project (3GPP), Mobile Competence Centre; 650, Route Des Lucioles; F-06921 Sophia-Antipolis Cedex; France, vol. RAN WG1, No. e-Meeting; Oct. 26, 2020-Nov. 13, 2020 Nov. 1, 2020 (Nov. 1, 2020), XP052350815, sections 1, 2.2.1, 2.2.2.

Mediatek Inc: "Discussion on NR MBS group scheduling for RRC_Connected UEs", 3GPP Draft; R1-2100613, 3rd Generation Partnership Project (3GPP), Mobile Competence Centre; 650, Route Des Lucioles; F-06921 Sophia-Antipolis Cedex; France, vol. RAN WG1, No. e-Meeting; Jan. 25, 2021-Feb. 5, 2021 Jan. 19, 2021 (Jan. 19, 2021), XP051971084, sections 1, 2.3, 2.4.

Partial Supplementary European Search Report issued on Jul. 22, 2024 for European patent Application No. 21951200.1.

First Office Action of the European patent application No. 21951200.1, issued on Jul. 31, 2025.

International Search Report of International Application No. PCT/CN2021/108660, mailed on Apr. 26, 2022, with English translation provided by WIPO.

Written Opinion of the International Search Authority in the International Application No. PCT/CN2021/108660, mailed on Apr. 26, 2022, with English translation provided by WIPO.

3GPP TSG-RAN1 Meeting #96 R1-1902649, Athens, Greece, Feb. 25-Mar. 1, 2019, Title: Correction to DCI size alignment procedure in TS 38.212, Source to WG: Sharp, all pages.

3GPP TSG RAN WG1 Meeting #96bis R1-1905248, Xi'an, China, Apr. 8-12, 2019, Title: Correction on DCI size alignment in TS 38.212, Source to WG: Huawei, HiSilicon, all pages.

Oral Proceedings of the corresponding European application No. 21951200.1, issued on Jun. 19, 2026.

* cited by examiner

WIRELESS COMMUNICATION METHOD, TERMINAL DEVICE, AND NETWORK DEVICE

CROSS-REFERENCE TO RELATED APPLICATION

This application is a continuation of International Application No. PCT/CN2021/108660 filed on Jul. 27, 2021, the disclosure of which is hereby incorporated by reference in its entirety.

BACKGROUND

In an NR system, the Multicast Broadcast Service (MBS) transmission needs to support a one-to-many multicast transmission. A terminal device may need to receive both a unicast service and an MBS, and the terminal device may support a variety of different MBSs. For different MBSs, due to the difference in MBS types, the bit fields required for Downlink Control Information (DCI) in a Physical Downlink Control Channels (PDCCHs) that schedule the MBSs may also be different, which will also increase bit numbers for the PDCCHs that the terminal device possibly needs to detect. Therefore, how to reduce the complexity of PDCCH detection by the terminal device is an urgent problem to be solved.

SUMMARY

Embodiments of the present disclosure relate to the field of communications, and in particular to, a method for wireless communication, a terminal device and a network device.

The present disclosure provides a method for wireless communication, a terminal device and a network device, which are beneficial to reducing the complexity of PDCCH detection by the terminal device.

In a first aspect, there is provided a method for wireless communication including: a terminal device detects, in a first search space, a PDCCH scrambled by at least one Group Radio Network Temporary Identifier (G-RNTI), where the first search space includes at least one of a Common Search Space (CS S) or a User Equipment (UE) specific Search Space (USS), and a number of types of bit numbers of Downlink Control Information (DCI) carried by the PDCCH scrambled by the at least one G-RNTI is less than or equal to a first threshold.

In a second aspect, there is provided a method for wireless communication including: a terminal device receives, in a first search space, a first PDCCH scrambled by a first Radio Network Temporary Identifier (RNTI), where a value of a Hybrid Automatic Repeat reQuest (HARQ) process field in DCI carried by the first PDCCH is a first value, and a second PDCCH is a PDCCH that is last received by the terminal device and for which the HARQ process field in the DCI has the first value. The terminal device determines whether a Physical Downlink Shared Channel (PDSCH) scheduled by the first PDCCH is a retransmission of a PDSCH scheduled by the second PDCCH according to at least one of: the first search space, a search space in which the second PDCCH is received, the first RNTI, an RNTI scrambling the second PDCCH, a value of a New Data Indicator (NDI) field in the DCI carried by the first PDCCH or a value of an NDI field in DCI carried by the second PDCCH.

In a third aspect, there is provided a method for wireless communication including: a network device sends, in a first search space, a PDCCH scrambled by at least one G-RNTI, where the first search space includes at least one of a CSS or a USS, and a number of types of bit numbers of DCI carried by the PDCCH scrambled by the at least one G-RNTI is less than or equal to a first threshold.

DETAILED DESCRIPTION

Figure 1:
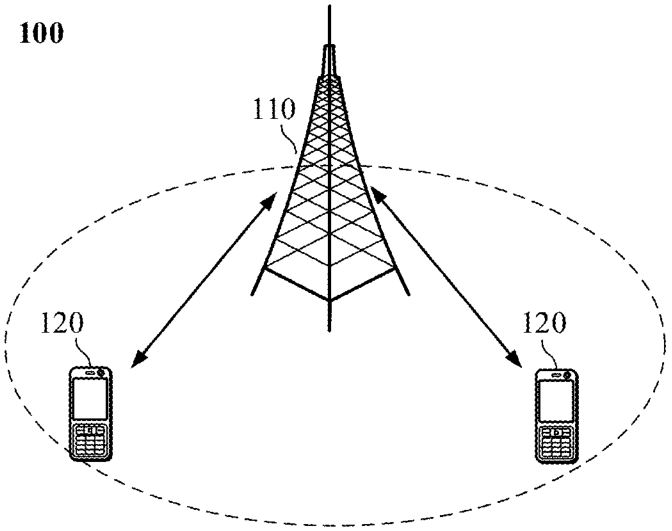
FIG. 1 is a schematic diagram of a communication system architecture according to an embodiment of the present disclosure.

The technical scheme in the embodiments of the disclosure will be described below in conjunction with the drawings in the embodiments of the disclosure. It is apparent that the described embodiments are parts of the embodiments of the disclosure, not all of the embodiments. Based on the embodiments of the disclosure, all other embodiments obtained by those skilled in the art without creative effort fall within the scope of protection of the disclosure.

The technical scheme of the embodiments of the present disclosure may be applied to various communication systems, such as Global System of Mobile Communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunications System (UMTS), Wireless Local Area Network (WLAN), Wireless Fidelity (Wi-Fi), 5th-Generation (5G) system or other communication systems.

In general, traditional communication systems support a limited number of connections and the connections are easy to implement. However, with the development of communication technology, mobile communication systems will not only support traditional communication, but also support, for example, Device To Device (D2D) communication, Machine To Machine (M2M) communication, Machine Type Communication (MTC), Vehicle To Vehicle (V2V) communication, or Vehicle To Everything (V2X) communication, etc. Embodiments of the present disclosure may also be applied to these communication systems.

Optionally, the communication system in embodiments of the present disclosure may be applied to a Carrier Aggregation (CA) scenario, a Dual Connectivity (DC) scenario, or a Standalone (SA) networking scenario.

Optionally, the communication system in the embodiments of the present disclosure may be applied to an unlicensed spectrum, and the unlicensed spectrum may also be considered as a shared spectrum. Optionally, the communication system in the embodiments of the present disclosure may also be applied to a licensed spectrum, and the licensed spectrum may also be considered as a non-shared spectrum.

Embodiments of the present disclosure are described in connection with a network device and a terminal device. The terminal device may also be referred to as a User Equipment (UE), an access terminal, a subscriber unit, a subscriber station, a mobile station, a remote terminal, a mobile device, a user terminal, a terminal, a wireless communication device, a user agent or a user device, etc.

The terminal device may be a STATION (ST) in the WLAN, a cellular telephone, a cordless telephone, a Session Initiation Protocol (SIP) telephone, a Wireless Local Loop (WLL) station, a Personal Digital Assistant (PDA) device, a handheld device having a wireless communication function, a computing device or other processing device connected to a wireless modem, a vehicle-mounted device, a wearable device, a terminal device in a next generation communication system such as an NR network, or a terminal device in a future evolved Public Land Mobile Network (PLMN) network, etc.

In the embodiments of the present disclosure, the terminal device may be deployed on land, and include indoor or outdoor device, hand-held device, wearable device or vehicle-mounted device. The terminal device may also be deployed on the water (such as on the ships, etc.). The terminal device may also be deployed in the air (such as, in airplanes, in balloons and in satellites, etc.).

In the embodiments of the present disclosure, the terminal device may be a mobile phone, a Pad, a computer with wireless transceiver function, a Virtual Reality (VR) terminal device, an Augmented Reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home, etc.

By way of example and not as a limitation, in the embodiments of the present disclosure, the terminal device may also be a wearable device. The wearable device may also be referred to as a wearable smart device, which is a general term of wearable devices that are intelligently designed and developed by applying wearable technology to daily wear, such as, glasses, gloves, watches, clothing and shoes. The wearable device is a portable device that is worn directly on the body or integrated into the user's clothes or accessories. The wearable device is not only a kind of hardware device, but also implements powerful functions through software support, data interaction and cloud interaction. The generalized wearable smart device has full functions and a large size, and the generalized wearable smart device may implement complete or partial functions without relying on smart phones, such as smart watches or smart glasses, and the generalized wearable smart device only focus on certain application functions and need to be used in conjunction with other devices (such as, smart phones), such as, various smart bracelets and smart jewelry for monitoring physical signs.

In the embodiments of the present disclosure, the network device may be a device configured to communicate with a mobile device, and the network device may be an Access Point (AP) in a WLAN, a Base Transceiver Station (BTS) in a GSM or CDMA, a NodeB (NB) in a WCDMA, an evolved Node B (eNB or eNodeB) in an LTE, a relay station or an access point, a vehicle-mounted device, a wearable device, a network device (gNB) in an NR network, a network device in a future evolved PLMN network or a network device in an NTN network, etc.

By way of example and not as a limitation, in the embodiments of the present disclosure, the network device may have mobility characteristics, for example, the network device may be a mobile device. Optionally, the network device may be a satellite, a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, and the like. Optionally, the network device may also be a base station located on land, water, etc.

In the embodiments of the present disclosure, the network device may provide a service for a cell, and the terminal device communicates with the network device through transmission resources (e.g. frequency resources, or spectrum resources) used by the cell. The cell may be a cell corresponding to the network device (e.g. base station), and the cell may belong to a macro base station or a base station corresponding to a small cell. The small cell may include a metro cell, a micro cell, a pico cell, a femto cell, etc. These small cells have characteristics of small coverage and low transmission power, and these small cells are suitable for providing a high-rate data transmission service.

Exemplarily, the communication system 100 to which the embodiments of the present disclosure are applied is illustrated in FIG. 1. The communication system 100 may include a network device 110. The network device 110 may be a device that communicates with a terminal device 120 (which also referred to as a communication terminal or terminal). The network device 110 may provide communication coverage for a particular geographic area and may communicate with terminal devices located within the coverage.

FIG. 1 exemplarily illustrates one network device and two terminal devices. In some embodiments, the communication system 100 may include multiple network devices, and other numbers of terminal devices may be included within the coverage of each network device, which is not limited by the embodiments of the present disclosure.

Optionally, the communication system 100 may also include other network entities, such as, network controllers, mobility management entities, etc., which are not limited by the embodiments of the present disclosure.

It should be understood that a device having a communication function in the network or system in the embodiments of the present disclosure may be referred to as a communication device. The communication system 100 illustrated in FIG. 1 is taken as an example, the communication device may include a network device 110 and a terminal device 120 that both have the communication function, and the network device 110 and the terminal device 120 may be specific devices described above, which will not be described herein. The communication device may also include other devices in the communication system 100, such as, network controllers, mobility management entities and other network entities, which are not limited in the embodiments of the present disclosure.

It should be understood that the terms “system” and “network” are often used interchangeably herein. In the present disclosure, the term “and/or” is only an association relationship describing associated objects and represents that three relationships may exist. For example, A and/or B may represent three conditions: i.e., independent existence of A, existence of both A and B and independent existence of B. In addition, the character “I” in the disclosure generally indicates that the relationship between the related objects is “or”.

It should be understood that the reference to “indication” in the embodiments of the present disclosure may be a direct indication, may be an indirect indication, or may be indicative of an association. For example, A indicates B, which may mean that A directly indicates B, for example, B may be obtained through A; it may also mean that A indirectly indicates B, for example, A indicates C, and B may be obtained by C; and it may also indicate that there is an association between A and B.

In the description of the embodiments of the present disclosure, the term “correspondence” may mean that there is a direct correspondence or an indirect correspondence between the two, may also mean that there is an association relationship between the two, and may also be a relationship between indication and being indicated, configuration and being configured, etc.

In the embodiments of the present disclosure, “predefined” may be achieved by pre-storing corresponding codes, tables or other means used for indicating relevant information in devices (e.g., including terminal devices and network devices), and the present disclosure is not limited to the specific implementation thereof. For example, predefined may refer to what is defined in the protocol.

In the embodiments of the present disclosure, the “protocol” may be a standard protocol in the communication field. For example, the protocol may include an LTE protocol, an NR protocol, and related protocols applied in future communication systems, which are not limited in the present disclosure.

With the pursuit of high rate, small delay, high-rate mobility, energy efficiency, and the diversity and complexity of services in future life, 5G is being developed for this purpose by the International Standards Organization of 3rd Generation Partnership Project (3GPP). The main application scenarios of the 5G are enhanced Mobile Broadband (eMBB), Ultra-Reliable Low-Latency Communications (URLLC), and massive Machine-Type Communications (mMTC).

The eMBB continues to target users’ access to multimedia content, services and data, and users’ demands grow very rapidly. On the other hand, since the eMBB may be deployed in different scenarios, such as indoor area, urban area, rural area, and the like, the differences in the capabilities and requirements thereof are also relatively large, it is not possible to generalize, and detailed analysis must be done in combination with a specific deployment scenario. Typical applications for URLLC include: industrial automation, power automation, telemedicine operations (surgery), traffic safety, etc. Typical features of mMTC include: high connection density, small data volume, delay-insensitive services, low cost and long service life of modules, and the like.

In the 5G network environment, a new RRC state, i.e., RRC_INACTIVE state (the RRC inactive state), is defined for the purpose of reducing air interface signaling, quickly restoring wireless connection and quickly restoring data traffic. The new RRC state is different from the RRC_IDLE state (i.e., RRC idle state) and the RRC_CONNECTED state (i.e., RRC connected state).

In the RRC_IDLE state, the mobility is UE-based cell selection/cell reselection, paging is initiated by a Core Network (CN), a paging area is configured by the CN, and UE Access Stratum (AS) context and RRC connection do not exist at the base station side.

In the RRC_CONNECTED state, an RRC connection exists, the base station and UE have the UE AS context, the network side knows the position of the UE at a level of a specific cell, the mobility is controlled by the network device, and unicast data may be transmitted between the UE and the base station.

In the RRC_INACTIVE state, the mobility is UE-based cell selection/cell reselection, there is a CN-NR connection, a certain base station has the UE AS context, the paging is triggered by a Radio Access Network (RAN), an RAN-based paging area is managed by the RAN, and the network side knows the position of the UE at a level of an RAN-based paging area.

It should be noted that in the embodiment of the present disclosure, the RRC_INACTIVE state may also be referred to as the deactivated state, which is not limited in the present disclosure.

In the NR system, the maximum channel bandwidth that is supported may be 400 MHz (which is referred to as wideband carrier). If the UE keeps operating on the wideband carrier, the power consumption of the UE is very large. Adjusting the Radio Frequency (RF) bandwidth of the UE according to an actual throughput of the UE can optimize the power consumption of the UE, which is the motivation of introducing the Bandwidth Part (BWP).

For example, if the rate of the UE is very low, a smaller BWP may be configured for the UE, and if the UE has a very high requirement on the rate, a larger BWP may be configured for the UE. If the UE supports high rate or operates in the CA mode, multiple BWPs may be configured for the UE. Another purpose of the BWP is to trigger the coexistence of multiple basic numerologies in a cell.

The Multimedia Broadcast Multicast Service (MBMS) is a technology that transmits data from one data source to multiple UEs by sharing network resources. The MBMS can effectively utilize network resources while providing the multimedia service, thereby implementing high-rate (e.g., 256 kbps) broadcast and multicast of the multimedia service.

Since the spectrum efficiency of the MBMS is too low to effectively bear and support the operation of mobile TV services, the it is further proposed to support the downlink high-rate Enhanced MBMS (eMBMS), and the design requirements for the physical layer and the air interface are determined.

The concept of the Single Frequency Network (SFN) is proposed for the eMBMS, i.e., a unified frequency is adopted to simultaneously send data in all cells, but it is necessary to ensure the synchronization between the cells. This manner can greatly improve the overall Signal-To-Noise Ratio (SNR) distribution of the cells, and the spectrum efficiency will be greatly improved accordingly. The broadcast and multicast of services can be achieved based on the Internet Protocol (IP) multicast protocol.

In the LTE system, the MBMS has only a broadcast bearer mode, but no multicast bearer mode.

The reception of the MBMS is adaptable to the terminal device in the RRC_CONNECTED state or the RRC_IDLE state.

In some scenarios, the Single Cell Point to Multipoint (SC-PTM) is introduced. The SC-PTM is based on the MBMS network architecture, and the Multi-cell/multicast Coordination Entity (MCE) decides whether to adopt the SC-PTM transmission mode or the Multimedia Broadcast multicast service Single Frequency Network (MBSFN) transmission mode.

Figure 2:
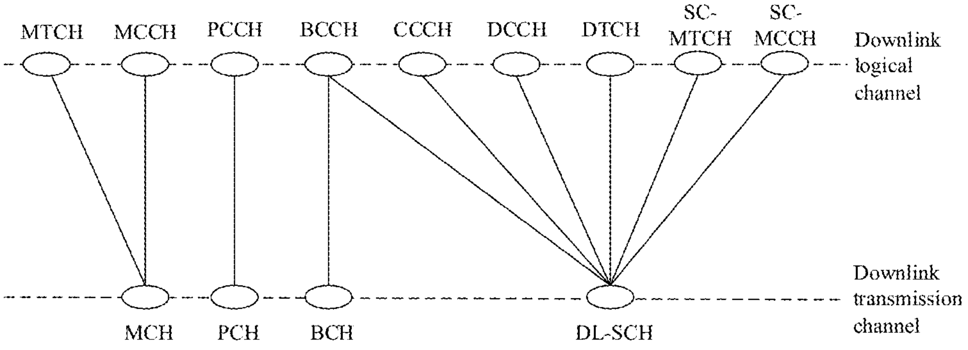
FIG. 2 is a schematic diagram of Single Cell Point To Multiploint (SC-PTM) channels and a mapping mode of the SC-PTM channels.

In some scenarios, new logical channels, i.e., the Single Cell Multicast Control Channel (SC-MCCH) (with LCID=11001) and the Single Cell Multicast Transport Channel (SC-MTCH) (with LCID=11001) are introduced. As shown in FIG. 2, the SC-MCCH and the SC-MTCH are mapped to the transmission channel of the Downlink Shared Channel (DL-SCH) and the physical channel of the Physical Downlink Shared Channel (PDSCH). The SC-MCCH and the SC-MTCH do not support the operation of the Hybrid Automatic Repeat reQuest (HARM), and adopt the Radio Link Control (RLC) the Unacknowledged Mode (UM).

In some scenarios, a new type of System Information Block (SIB) is introduced. That is to say, the SIB20 is used for transmitting configuration information of the SC-MCCH, and only one SC-MCCH exists in one cell. The configuration information includes a modification Period of the SC-MCCH, a Repetition Period of the SC-MCCH (which is represented by mcch-RepetitionPeriod), and configuration information of the radio frame and subframe.

In some embodiments, the radio frame (specifically, mcch-Offset) for scheduling the SC-MCCH may be determined according to a formula: SFN mod mcch-RepetitionPeriod=mcch-Offset.

In some embodiments, the subframe for scheduling the SC-MCCH is indicated by the sc-mcch-Subframe.

In some embodiments, the SC-MCCH transmits only one message SCPTMConfiguration for configuring configuration information of the SC-PTM. A new Radio Network Temporary Identifier (RNTI), i.e., the Single Cell RNTI (C-RNTI) (having a fixed value of FFFC) is introduced to identify scheduling information of the SC-MCCH on the Physical Downlink Control Channel (PDCCH).

In some scenarios, a new RNTI, i.e., the Single Cell Notification RNTI (SC-N-RNTI) (having a fixed value of FFFB) is introduced to identify a PDCCH corresponding to the change notification of the SC-MCCH. One of the eight bits in DCI 1C is used for indicating the change notification. The modification period boundary is defined as: SFN mod m=0, where m is the modification period sc-mcch-ModificationPeriod configured in the SIB20.

In the NR system, the RLC Acknowledged Mode (AM) has an Automatic Repeat reQuest (ARQ) feedback mechanism. The receiving end sends an RLC status report to feedback that the receiving status of the RLC packet is an Acknowledgement (ACK) or a Negative Acknowledgement (NACK). The sending end may repeatedly send an RLC packet having a sequence number (SN) for which the NACK is repeatedly fed back.

A downlink BWP is configured by BWP-Downlink parameters, as shown in the first paragraph of the ASN.1 codes below. The BWP-Downlink parameters include: a BWP identifier (BWP-ID) for identifying an ID of the current BWP, and a BWP-Common for configuring common parameters of the downlink BWP. The second paragraph of the ASN.1 codes shows the common parameters included in the BWP-Common. The genericParameters in the BWP-DownlinkCommon is used for configuring the frequency domain starting point of the downlink BWP and the number of physical resource blocks (PRBs) included in the downlink BWP. For a terminal dedicated unicast BWP, the parameter BWP-Dedicated in the BWP-Downlink will configure downlink reception parameters on the downlink BWP, as shown in the third paragraph of the ASN.1 code, the BWP-Dedicated at least includes: a Physical Downlink Control Channel (PDCCH) configuration (i.e., pdcch-Config), a Physical Downlink Shared Channel (PDSCH) configuration (i.e., pdsch-Config), and a Semi-Persistent Scheduling (SPS) configuration (i.e., sps-Config). The pdcch-Config is used for indicating a PDCCH transmission mode on the downlink BWP, the pdsch-Config is used for indicating the PDSCH transmission mode on the downlink BWP, and the sps-Config is used for indicating the SPS configuration on the downlink BWP.

The first paragraph of the ASN.1 codes are as follows.

```
BWP-Downlink ::=                SEQUENCE {
   bwp-Id                  BWP-Id,
   bwp-Common                                    BWP-DownlinkCommon
OPTIONAL, -- Cond SetupOtherBWP
   bwp-Dedicated                                 BWP-DownlinkDedicated
OPTIONAL, -- Cond SetupOtherBWP
   ...
}
```

The second paragraph of ASN.1 codes are as follows.

```
BWP-DownlinkCommon ::=          SEQUENCE
   genericParameters            BWP,
   pdcch-ConfigCommon                  SetupRelease { PDCCH-ConfigCommon }
OPTIONAL, -- Need M
   pdsch-ConfigCommon                  SetupRelease { PDSCH-ConfigCommon }
OPTIONAL, -- Need M
   ...
}
```

The third paragraph of the ASN.1 codes are as follows.

```
BWP-DownlinkDedicated ::=           SEQUENCE {
  pdcch-Config                          SetupRelease { PDCCH-Config }
OPTIONAL, -- Need M
  pdsch-Config                          SetupRelease { PDSCH-Config }
OPTIONAL, -- Need M
  sps-Config                              SetupRelease { SPS-Config }
  OPTIONAL, -- Need M
radioLinkMonitoringConfig   SetupRelease { RadioLinkMonitoringConfig }
OPTIONAL, -- Need M
    ...,
```

In the NR system, the Multicast and Broadcast Service (MBS) needs to support the one-to-many multicast transmission in which a base station needs to schedule a common Physical Downlink Shared Channel (PDSCH) by sending a common PDCCH. The common PDCCH and the common PDSCH are scrambled by a Group Radio Network Temporary Identifier (G-RNTI) and sent within a common frequency Resource (CFR). Downlink Control Information (DCI) carried by the common PDCCH may have two different types. The first type of DCI has a small number of bits and is mainly used for ensuring the coverage of UEs at the cell edge. The second type of DCI has no optimization on the number of bits, and is mainly used for ensuring transmission performance of the MBS. In order to improve the reliability of the MBS data retransmission, a TB sent through the common PDSCH may be retransmitted in a unicast or PTP manner.

Since the common PDCCH for scheduling the common PDSCH needs to be simultaneously sent to multiple receiving terminals, in order to ensure that the common DCI carried in the common PDCCH determined by the multiple terminals has a same bit number, the terminal devices cannot determine the bit number of the common DCI according to configurations of their respective dedicated unicast BWPs. In addition, since the number of PRBs of the CFR may be different from that included in the initial BWP or COntrol REsource SET 0 (CORESET #0) currently configured for the terminal, the terminal device cannot determine the bit number of the common DCI through the initial BWP or the CORESET #0. Because the terminal device needs to support a variety of different MBSs, the G-RNTIs corresponding to different MBSs may be different. For PDCCHs scrambled by different G-RNTIs, due to the difference in MBS types, bit numbers required by the DCI in PDCCHs that schedule the MBSs may also be different, which will also increase the bit numbers for the PDCCHs that the terminal device possibly needs to detect. Therefore, how to reduce complexity of PDCCH detection by the terminal device is an urgent problem to be solved.

In addition, the terminal device may need to receive both the unicast service and the MBS, and the network device may schedule, in the PTP manner, the retransmission of a Transport Block (TB) of the MBS sent by the common PDSCH. In this case, how to determine what scheduled by the PDCCH of the network device is the retransmission of the unicast transmission or the retransmission of the MBS transmission is also an urgent problem to be solved for the terminal device.

In order to facilitate understanding of the technical schemes of the embodiments of the present disclosure, the technical schemes of the present disclosure will be described in detail below by way of specific embodiments. The above related technologies, as optional schemes, may be arbitrarily combined with the technical schemes of the embodiments of the present disclosure, and all of these combinations belong to the protection scope of the embodiments of the present disclosure. The embodiments of the present disclosure include at least some of following contents.

Figure 3:
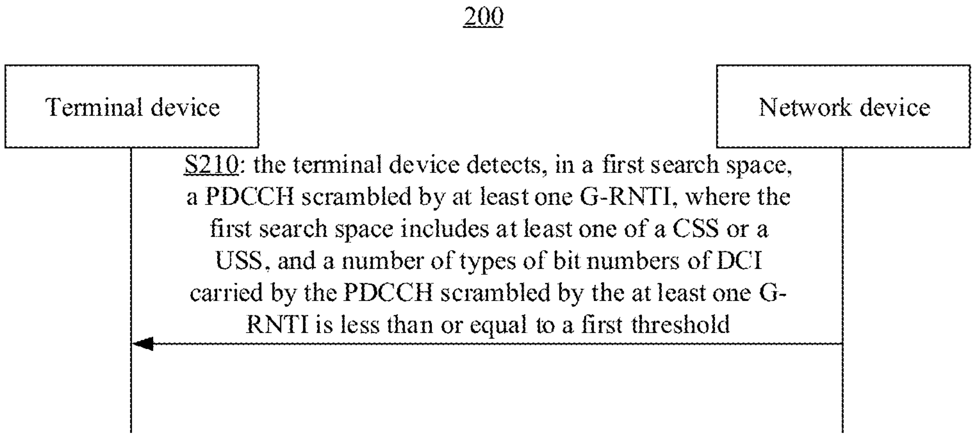
FIG. 3 is a schematic interaction diagram of a method for wireless communication provided according to an embodiment of the present disclosure.

FIG. 3 is a schematic flowchart of a method 200 for wireless communication according to an embodiment of the present disclosure. The method 200 may be performed by the terminal device in the communication system shown in FIG. 1. As shown in FIG. 3, the method 200 includes operations S210 to S220.

In operation S210, a terminal device detects, in a first search space, a PDCCH scrambled by at least one G-RNTI.

In some embodiments, the PDCCH scrambled by the G-RNTI may be used for scheduling a transmission of the MBS, such as an initial transmission of the MBS, or a retransmission of the MBS.

In some embodiments, different G-RNTIs may be used for scheduling different MBSs.

In some embodiments, the PDCCH scrambled by the G-RNTI may be transmitted in the Common Search Space (CSS). Therefore, the terminal device may detect PDCCHs scrambled by one or more G-RNTIs in the CSS.

In other embodiments, the PDCCH scrambled by the G-RNTI may be transmitted in the UE Search Space (USS). Therefore, the terminal device may detect PDCCHs scrambled by one or more G-RNTIs in the USS.

In some embodiments, the PDCCH scrambled by the G-RNTI detected by the terminal device in the USS is used for scheduling a retransmission of the MBS.

In some embodiments of the present disclosure, the first search space includes the CSS and/or the USS.

In some embodiments of the present disclosure, the number of types of bit numbers of Downlink Control Information (DCI) carried by the PDCCH scrambled by the at least one G-RNTI detected by the terminal device in the first search space does not exceed an ability of the terminal. By designing that the number of types of the bit numbers of the DCI carried by the PDCCH scrambled by the G-RNTI detected by the terminal device in the first search space does not exceed a first threshold, on one hand, the complexity of PDCCH detection by the terminal can be reduced; on the other hand, unnecessary bit transmissions on network side can be reduced, and the utilization efficiency of the system resources can be improved.

Optionally, a fact that the number of types of the bit numbers of the DCI carried by the PDCCH scrambled by the at least one G-RNTI detected by the terminal device in the first search space is less than or equal to the first threshold includes at least one of followings:

the number of types of the bit numbers of the DCI carried by the PDCCH scrambled by the G-RNTI detected by the terminal device in the CSS is less than or equal to the first threshold; or the number of types of the bit numbers of the DCI carried by the PDCCH scrambled by the G-RNTI detected by the terminal device in the USS is less than or equal to the first threshold.

It should be appreciated that, in the embodiment of the present disclosure, a threshold corresponding to the number of types of the bit numbers of the DCI carried by the PDCCH scrambled by the G-RNTI detected by the terminal device in the CSS may be identical to or different from a threshold corresponding to the number of types of the bit numbers of the DCI carried by the PDCCH scrambled by the G-RNTI detected by the terminal device in the USS, which is not limited in the embodiment of the present disclosure.

Hereinafter, a method for designing the bit numbers of the DCI carried by the PDCCH scrambled by the G-RNTI detected by the terminal device in the CSS and a method for designing the bit numbers of the DCI carried by the PDCCH scrambled by the G-RNTI detected by the terminal device in the USS will be described, respectively, in connection with a first embodiment and a second embodiment.

In the first embodiment, the terminal device may detect, in the CSS, PDCCHs scrambled by one or more G-RNTIs.

In some embodiments, configuration signaling of the CSS includes a Control Resource Set (CORESET) identity parameter for indicating a CORESET associated with the CSS, a CORESET corresponding to a CORESET identity being within a Common Frequency Resource (CFR).

As an implementation of the first embodiment, DCI carried by PDCCHs scrambled by all G-RNTIs detected by the terminal device in the CSS has a same bit number. For example, all the DCI has the first bit number. This implementation is beneficial to minimize the number of the types of the bit numbers for the PDCCH that the terminal device possibly needs to detect in the CSS.

Optionally, the bit numbers of the DCI carried by the PDCCHs scrambled by all G-RNTIs detected by the terminal device in the CSS are predefined, or configured by a network device. That is to say, the first bit number may be predefined or configured by the network device.

For example, the bit numbers of the DCI carried by the PDCCHs scrambled by all G-RNTIs detected by the terminal device in the CSS are configured by the network device through RRC signaling. That is to say, the network device may configure the first bit number through the RRC signaling.

As a specific example, the network device may configure the bit numbers of the DCI carried by the PDCCH scrambled by the G-RNTI detected by the terminal device in the CSS through the configuration signaling of the CSS. That is to say, the network device may configure the bit numbers of the DCI carried by the PDCCH scrambled by the G-RNTI detected by the terminal device in the CSS simultaneously when the network device configures the CSS, so that the terminal device may parse the DCI based on the bit numbers, which is beneficial to reduce the complexity of processing of the terminal device.

In some embodiments, if a bit number of DCI carried by a PDCCH scrambled by a first G-RNTI is less than the first bit number, the network device may ensure, in following two manners, that the bit number of the DCI carried by the PDCCH scrambled by the first G-RNTI is the first bit number.

In a manner 1, padding bits are added in the DCI. For example, a certain number of padding bits are added at an end of the DCI, so that the bit number of the DCI is equal to the first bit number.

In a manner 2, a first bit field is added in the DCI, and a value of the first bit field is set as an invalid value, so that the bit number of the DCI is equal to the first bit number.

For example, if the MBS corresponding to the first G-RNTI does not need to indicate the Hybrid Automatic Repeat reQuest (HARQ) feedback manner through the DCI, and a bit field indicating the HARQ feedback manner is 2 bits, then the bit number of the DCI carried by the PDCCH scrambled by the first G-RNTI is 2 bits less than the first bit number. According to a manner 2-1, the DCI carried by the PDCCH scrambled by the first G-RNTI does not include the bit field indicating the HARQ feedback manner, and two zeros are added at the end of the DCI to ensure that the bit number contained in the DCI is equal to the first bit number. According to a manner 2-2, the bit field indicating the HARQ feedback manner may be contained in the DCI, and a value of the bit field may be further set as an invalid value. For example, if the bit field has the first value, it means that the HARQ feedback is not needed; if the bit field has the second value, it means that the HARQ feedback is performed in the first mode; if the bit field has the third value, it means that the HARQ feedback is performed in the second mode; and if the bit field has the fourth value, it means that the bit field is invalid. In this case, the value of the bit field is the fourth value.

As another implementation of the first embodiment, the number of types of bit numbers of DCI carried by PDCCHs scrambled by all G-RNTIs detected by the terminal device in the CSS is less than or equal to the first threshold value. In other words, the terminal device expects not to detect, in the CSS, the number (which is greater than the first threshold) of types of the bit numbers of the DCI carried by the PDCCHs scrambled by all G-RNTIs. By designing that the number of types of the bit numbers of the DCI carried by the PDCCH scrambled by the G-RNTI detected by terminal device in the CSS does not exceed the first threshold, on one hand, the complexity of PDCCH detection by the terminal device in the CSS can be reduced; on the other hand, unnecessary bit transmissions on the network side can be reduced, and the utilization efficiency of the system resources can be improved.

In some embodiments, a bit number of DCI carried by a PDCCH scrambled by each G-RNTI detected by the terminal device in the CSS is predefined, or configured by a network device. For example, the bit number of the DCI may be configured by the network device through RRC signaling.

Optionally, the DCI carried by the PDCCHs scrambled by all G-RNTIs detected by the terminal device in the CSS may have a same bit number or different bit numbers.

Optionally, the bit number of the DCI carried by the PDCCH scrambled by each G-RNTI may be integratedly configured by the network device, or may be separately configured by the network device.

In some embodiments, the first threshold is predefined or configured by the network device, e.g. the first threshold is configured by the network device through the RRC signaling.

As another implementation of the first embodiment, the DCI carried by PDCCHs scrambled by the G-RNTI detected by the terminal device in the CSS is of a same type, or the terminal device detects, in the CSS, only a first target type of DCI carried by the PDCCHs scrambled by the G-RNTI. By designing that the terminal device to detect only DCI carried by the PDCCH scrambled by the specific type of the G-RNTI, it is beneficial to reduce the number of types of the bit numbers for the PDCCH detected by the terminal device, thereby reducing the complexity of PDCCH detection by the terminal device.

In other words, the network device may send, in the CSS, only the specific type of DCI, e.g., the first target type of DCI, carried by the PDCCH scrambled by the G-RNTI. Or, the terminal device may detect, in the CSS, only the first target type of DCI carried by the PDCCHs scrambled by the G-RNTI, in this case, the network device may send, in the CSS, various types of DCI carried by the PDCCH scrambled by the G-RNTI, or may send only the first target type of DCI carried by PDCCHs scrambled by the G-RNTI.

Optionally, the first target type of DCI is a first type of DCI or a second type of DCI, and a bit number of the first type of DCI is less than or equal to a bit number of the second type of DCI.

Optionally, the first type of DCI is used for ensuring the coverage of UEs at the cell edge and the second type of DCI is used for ensuring transmission performance of the MBS.

In some embodiments, the type of the DCI carried by the PDCCH scrambled by the G-RNTI detected by the terminal device in the CSS is predefined, or configured by a network device. That is to say, the first target type may be predefined, or configured by the network device. For example, the network device configures the first target type through RRC signaling.

As an optional implementation, the terminal device detects, in the CSS, only DCI having a specific format and scrambled by the G-RNTI.

In the second embodiment, the terminal device may detect, in the USS, PDCCHs scrambled by one or more G-RNTIs.

As an implementation of the second embodiment, the DCI carried by PDCCHs scrambled by the G-RNTI detected by the terminal device in the USS is of a same type, or the terminal device detects, in the USS, only the second target type of DCI carried by the PDCCHs scrambled by the G-RNTI.

In other words, the network device may send, in the USS, only the specific type of DCI, e.g., the second target type of DCI, carried by the PDCCH scrambled by the G-RNTI. Or, the terminal device may detect, in the USS, only the second target type of DCI carried by PDCCHs scrambled by the G-RNTI, in this case, the network device may send, in the USS, various types of DCI carried by the PDCCH scrambled by the G-RNTI, or may send only the second target type of DCI carried by PDCCHs scrambled by the G-RNTI.

Optionally, the second target type of DCI is a first type of DCI or a second type of DCI, and a bit number of the first type of DCI is less than or equal to a bit number of the second type of DCI.

Optionally, the first type of DCI is used for ensuring the coverage of UEs at the cell edge and the second type of DCI is used for ensuring transmission performance of the MBS.

In some embodiments, the type of the DCI carried by the PDCCH scrambled by the G-RNTI detected by the terminal device in the USS is predefined, or configured by a network device. That is to say, the second target type may be predefined, or configured by the network device. For example, the network device configures the second target type through RRC signaling.

Optionally, in some embodiments, the first target type may be identical to or different from the second target type.

As another implementation of the second embodiment, the DCI carried by PDCCHs scrambled by all G-RNTIs detected by the terminal device in the USS has a same bit number. For example, all the DCI has the second bit number. This implementation is beneficial to minimize the number of the types of the bit numbers for the PDCCH that the terminal device possibly needs to detect in the USS.

Optionally, the bit numbers of the DCI carried by the PDCCHs scrambled by all G-RNTIs detected by the terminal device in the USS are predefined, or configured by a network device. That is to say, the second bit number may be predefined, or configured by the network device.

For example, the bit numbers of the DCI carried by the PDCCHs scrambled by all G-RNTIs detected by the terminal device in the USS are configured by the network device through RRC signaling. That is to say, the network device may configure the second bit number through the RRC signaling.

As a specific example, the network device may configure the bit numbers of the DCI carried by the PDCCH scrambled by the G-RNTI detected by the terminal device in the USS through the configuration signaling of the USS. That is to say, the network device may configure the bit numbers of the DCI carried by the PDCCH scrambled by the G-RNTI detected by the terminal device in the USS simultaneously when the network device configures the USS, so that the terminal device may parse the DCI based on the bit numbers, which is beneficial to reduce the complexity of processing of the terminal device.

In some embodiments, if a bit number of DCI carried by a PDCCH scrambled by a second G-RNTI is less than the second bit number, the network device may ensure that the bit number of the DCI carried by the PDCCH scrambled by the second G-RNTI is the second bit number by using the manner 1 or the manner 2 described in the first embodiment, which will not be repeated herein for the sake of brevity.

As a further implementation of the second embodiment, the number of types of bit numbers of DCI carried by PDCCHs scrambled by all G-RNTIs detected by the terminal device in the USS is less than or equal to the first threshold value. In other words, the terminal device expects not to detect, in the USS, the number (which is greater than the first threshold) of types of the bit numbers of DCI carried by the PDCCHs scrambled by all G-RNTIs. By designing that the number of types of the bit numbers of the DCI carried by the PDCCH scrambled by the G-RNTI detected by terminal device in the USS does not exceed the first threshold, on one hand, the complexity of PDCCH detection by the terminal device in the USS can be reduced; on the other hand, unnecessary bit transmissions on the network side can be reduced, and the utilization efficiency of the system resources can be improved.

In some embodiments, a bit number of DCI carried by a PDCCH scrambled by each G-RNTI detected by the terminal device in the USS is predefined, or configured by a network device. For example, the bit number of the DCI may be configured by the network device through RRC signaling.

Optionally, the DCI carried by the PDCCHs scrambled by all G-RNTIs detected by the terminal device in the USS may have a same bit number or different bit numbers. Optionally, the bit number of the DCI carried by the PDCCH scrambled by each G-RNTI may be integratedly configured by the network device, or may be separately configured by the network device.

In some embodiments, the first threshold is predefined or configured by the network device, e.g. the first threshold is configured by the network device through the RRC signaling.

To sum up, in the embodiment of the present disclosure, by designing that the DCI carried by the PDCCHs scrambled by all G-RNTIs received by the terminal device in the CSS has the same bit number, or the number of types of the bit numbers of the DCI carried by the PDCCHs scrambled by all G-RNTIs received by the terminal device in the CSS does not exceed a certain threshold, or the terminal device receives, in the CSS, only the first target type of DCI carried by the PDCCH scrambled by the G-RNTI, on one hand, the complexity of PDCCH detection by the terminal device in the CSS can be reduced; on the other hand, the unnecessary bit transmissions on the network side can be reduced, and the utilization efficiency of the system resources can be improved.

Optionally, by designing that the DCI carried by the PDCCHs scrambled by all G-RNTIs received by the terminal device in the USS has the same bit number, or the number of types of the bit numbers of the DCI carried by the PDCCHs scrambled by all G-RNTIs received by the terminal device in the USS does not exceed a certain threshold, or the terminal device receives, in the USS, only the second target type of DCI carried by PDCCHs scrambled by the G-RNTI, on one hand, the complexity of PDCCH detection by the terminal device in the USS can be reduced; on the other hand, the unnecessary bit transmissions on the network side can be reduced, and the utilization efficiency of the system resources can be improved.

Figure 4:
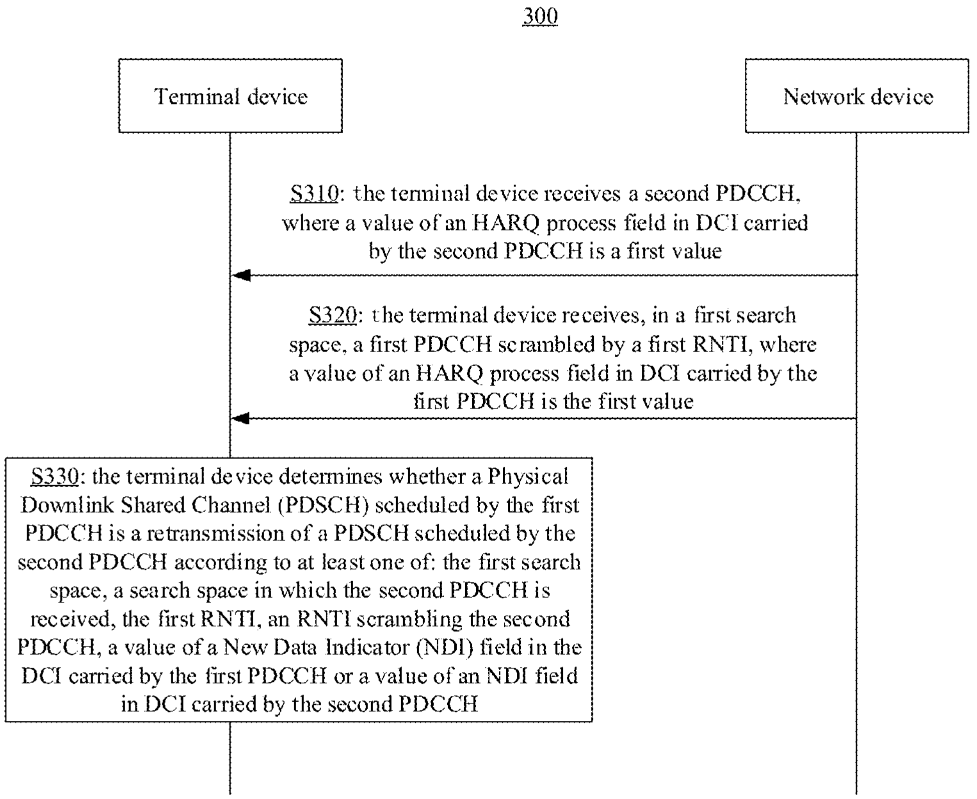
FIG. 4 is another schematic interaction diagram of a method for wireless communication provided according to an embodiment of the present disclosure.

FIG. 4 is a schematic flowchart of a method 300 for wireless communication according to another embodiment of the present disclosure. As shown in FIG. 4, the method 300 includes operations S310 to S330.

In operation S310, a terminal device receives a second PDCCH, where a value of an HARQ process field in DCI carried by the second PDCCH is a first value.

In operation S320, the terminal device receives a first PDCCH scrambled by a first RNTI in the first search space, where a value of an HARQ process field in DCI carried by the first PDCCH is the first value.

That is to say, the second PDCCH is a PDCCH that is last scheduled and for which an HARQ process number in the DCI has the first value.

In operation S330, the terminal device determines whether a PDSCH scheduled by the first PDCCH is a retransmission of a PDSCH scheduled by the second PDCCH according to at least one of: the first search space, a search space in which the second PDCCH is received, the first RNTI, an RNTI scrambling the second PDCCH, a value of an NDI field in the DCI carried by the first PDCCH or a value of an NDI field in DCI carried by the second PDCCH.

In some embodiments, the first search space is the CSS and the first RNTI is the G-RNTI. In this case, the terminal device may determine whether the PDSCH scheduled by the first PDCCH is the retransmission of the PDSCH scheduled by the second PDCCH according to the first RNTI and the RNTI scrambling the second PDCCH.

For example, if the terminal device detects the first PDCCH scrambled by the first G-RNTI in the CSS, and a value of the HARQ process field in the DCI carried by the first PDCCH is h, the terminal device may determine whether the PDSCH scheduled by the first PDCCH is a new transmission of an MBS Transport Block (TB) according to an RNTI corresponding to the PDCCH that is last received and indicates the HARQ process number h and according to the first G-RNTI.

In some cases, if the second PDCCH is scrambled by a second RNTI, and the second RNTI is different from the first G-RNTI, then the terminal device may consider that the PDSCH scheduled by the first PDCCH is a new transmission of the MBS TB.

It should be noted that in this case, the NDI field in the DCI carried by the first PDCCH scrambled by the first G-RNTI may not be toggled with respect to the NDI field in the DCI carried by the second PDCCH.

It should be understood that the first G-RNTI represents any one of the G-RNTIs configured for the terminal device.

Optionally, the second PDCCH may be received in the CSS or may also be received in the USS.

To sum up, the terminal device determines that the PDSCH scheduled by the first PDCCH is a new transmission of an MBS (i.e., the PDSCH scheduled by the first PDCCH is not a retransmission of the PDSCH scheduled by the second PDCCH) when following four conditions are satisfied.

The value of the HARQ process field in the DCI carried by the first PDCCH is identical to the value of the HARQ process field in the DCI carried by the second PDCCH.

The first PDCCH is received in the CSS.

The first PDCCH is scrambled by the first G-RNTI.

The second PDCCH is scrambled by the second RNTI, where the second RNTI is different from the first G-RNTI.

In other embodiments, the first search space is the USS, the first RNTI is a Cell Radio Network Temporary Identifier (C-RNTI), and the second PDCCH is scrambled by the second G-RNTI. In this case, the terminal device may determine whether a PDSCH scheduled by the first PDCCH is a retransmission of a PDSCH scheduled by the second PDCCH according to whether the value of the New Data Indicator (NDI) field in the DCI carried by the first PDCCH is identical to the value of the NDI field in the DCI carried by the second PDCCH.

For example, if the value of the NDI field in the DCI carried by the first PDCCH is identical to the value of the NDI field in the DCI carried by the second PDCCH, it is determined that the PDSCH scheduled by the first PDDCH is the retransmission of the PDSCH scheduled by the second PDCCH.

In another example, if the value of the NDI field in the DCI carried by the first PDCCH is different from the value of the NDI field in the DCI carried by the second PDCCH, it is determined that the PDSCH scheduled by the first PDDCH is not the retransmission of the PDSCH scheduled by the second PDCCH.

To sum up, the terminal device determines that the PDSCH scheduled by the first PDCCH is the retransmission of the PDSCH scheduled by the second PDCCH in a case where following five conditions are satisfied.

The first PDCCH is received in the USS.

The first PDCCH is scrambled by the first C-RNTI.

The second PDCCH is scrambled by the second G-RNTI.

The value of the HARQ process field in the DCI carried by the first PDCCH is identical to the value of the HARQ process field in the DCI carried by the second PDCCH.

The value of the NDI field in the DCI carried by the first PDCCH is identical to the value of the NDI field in the DCI carried by the second PDCCH.

It should be understood that the second G-RNTI may be any one of G-RNTIs configured for the terminal device.

In the embodiments of the present disclosure, the terminal device needs to receive both the unicast service and the MBS. For one MBS TB sent by the common PDSCH, the network device schedules the retransmission of the MBS in the PTP manner. In order to prevent the terminal device from identifying the retransmission of the MBS as the retransmission of the unicast service, in some embodiments of the present disclosure, if an HARQ process is used for the unicast service before it is used for the new transmission of the MBS, and the NDI for the PDCCH corresponding to the MBS is not toggled after the HARQ process is used for the MBS, then the terminal device does not expect the network device to schedule the retransmission of the MBS in the PTP manner.

For example, the terminal device expects not to receive, in the USS, a first target PDCCH scrambled by a C-RNTI, where the first target PDCCH satisfies following four conditions.

PDSCHs scheduled by the first target PDCCH are retransmission of PDSCHs scheduled by K PDCCHs previously received by the terminal device, where the K PDCCHs are scrambled by a third G-RNTI, and K is less than or equal to N, where N is a positive integer.

A value of an HARQ process field in DCI carried by the first target PDCCH is the first value, and a value of an HARQ process field in DCI carried by the K PDCCHs is also the first value.

A value of an NDI field in the DCI carried by the first target PDCCH is a second value, and a value of an NDI field in DCI carried by the K PDCCHs is also the second value.

An HARQ process number having the first value is used for a unicast transmission before being used for sending the K PDCCHs scrambled by the third G-RNTI.

Correspondingly, the network device does not send, in the USS, the first target PDCCH scrambled by the C-RNTI.

Optionally, the third G-RNTI may be any one of the G-RNTIs configured for the terminal device.

Optionally, the second value may be 0 or 1.

Optionally, N may be predefined or configured by the network device.

Optionally, N is 2 or 4, etc.

Figure 5:
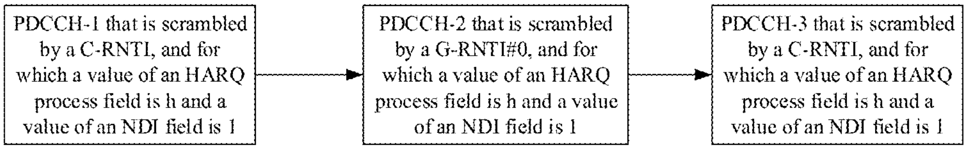
FIG. 5 is a schematic diagram of a reception sequence of PDCCHs according to an embodiment of the present disclosure.

As an example, as shown in FIG. 5, the terminal device firstly receives a PDCCH-1 scrambled by a C-RNTI, where a value of an HARQ process field in DCI carried by the PDCCH-1 is h, a value of an NDI field is 1, and the HARQ process h is used for the unicast service. Then, the terminal device receives a PDCCH-2 scrambled by a G-RNTI #0, where a value of an HARQ process field in DCI carried by the PDCCH-2 is h, a value of an NDI field is 1, and the HARQ process h is used for a new transmission of the MBS. In this case, the terminal device does not expect the network device to schedules the retransmission of the MBS in the PTP manner. That is to say, the terminal device expects not to receive a PDCCH-3 (i.e. the first target PDCCH) scrambled by a C-RNTI, and a PDSCH scheduled by the PDCCH-3 is a retransmission of a PDSCH scheduled by the PDCCH-2. Herein, a value of a HARQ process field in DCI carried by the PDCCH-3 is h, and a value of an NDI field is 1. In this way, when the terminal device receives the PDCCH-1 scrambled by the C-RNTI and does not detect the PDCCH-2 scrambled by the G-RNTI #0, it is possible to avoid the problem that the terminal device mistakenly regards the PDSCH scheduled by the PDCCH-3 scrambled by the C-RNTI as the retransmission of the PDSCH scheduled by previously received PDCCH-1 scrambled by the C-RNTI and further merges the two PDSCHs.

For another example, the terminal device expects not to receive, in the USS, a second target PDCCH scrambled by the C-RNTI, where the second target PDCCH satisfies following five conditions.

PDSCHs scheduled by the second target PDCCH are retransmission of PDSCHs scheduled by K PDCCHs previously received by the terminal device, where the K PDCCHs are scrambled by a fourth G-RNTI, and K is less than or equal to N, where N is a positive integer.

A value of an HARQ process field in DCI carried by the second target PDCCH is the first value, and a value of an HARQ process field in DCI carried by the K PDCCHs is also the first value.

A value of an NDI field in the DCI carried by the second target PDCCH is a second value, and a value of an NDI field in DCI carried by the K PDCCHs is also the second value.

The terminal device does not send HARQ feedback information for the PDSCHs scheduled by the K PDCCHs scrambled by the fourth G-RNTI on Physical Uplink Control Channel (PUCCH) resources indicated by the K PDCCHs scrambled by the fourth G-RNTI.

An HARQ process number having the first value is used for a unicast transmission before being used for sending the K PDCCHs scrambled by the fourth G-RNTI.

Correspondingly, the network device does not send, in the USS, the second target PDCCH scrambled by the C-RNTI.

Optionally, the failure of the terminal device to send HARQ feedback information for the PDSCHs scheduled by the K PDCCHs scrambled by the fourth G-RNTI on the PUCCH resources indicated by the K PDCCHs scrambled by the fourth G-RNTI may be due to the failure of the terminal device to receive the K PDCCHs scrambled by the fourth G-RNTI.

Optionally, the fourth G-RNTI may be any one of the G-RNTIs configured for the terminal device.

Optionally, the second value may be 1 or 0.

Optionally, N may be predefined or configured by the network device.

Optionally, N is 2 or 4, etc.

Figure 6:
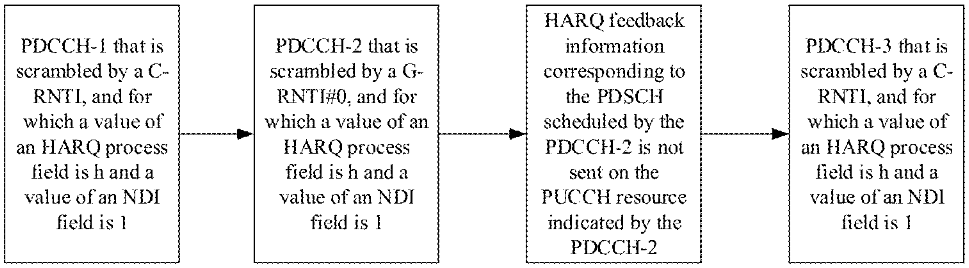
FIG. 6 is another schematic diagram of a reception sequence of PDCCHs according to an embodiment of the present disclosure.

As an example, as shown in FIG. 6, the terminal device firstly receives a PDCCH-1 scrambled by a C-RNTI. A value of an HARQ process field in DCI carried by the PDCCH-1 is h, and a value of an NDI field is 1. In this case, the HARQ process h is used for the unicast service.

Then, the terminal device receives a PDCCH-2 scrambled by a G-RNTI #0. A value of an HARQ process field in DCI carried by the PDCCH-2 is h, and a value of an NDI field is 1. In this case, the HARQ process h is used for a new transmission of the MBS, and the PDCCH-2 is also used for indicating a PUCCH resource for transmitting HARQ feedback information for the PDSCH scheduled by the PDCCH-2.

Further, the terminal device does not send HARQ feedback information for the PDSCH scheduled by the PDCCH-2 scrambled by the G-RNTI #0 on the PUCCH resource indicated by the PDCCH-2 scrambled by the G-RNTI #0. In other words, the network device cannot receive the HARQ feedback information for the PDSCH scheduled by the PDCCH-2 scrambled by the G-RNTI #0 on the PUCCH resource indicated by the PDCCH-2 scrambled by the G-RNTI #0. In this case, the network device cannot determine whether the terminal device has lost the PDCCH-2 scrambled by the G-RNTI #0.

In this case, the terminal device does not expect the network device to schedule the retransmission of the MBS in the PTP manner. That is to say, the terminal device expects not to receive the PDCCH-3 (i.e. the second target PDCCH) scrambled by the C-RNTI, and the PDSCH scheduled by PDCCH-3 is the retransmission of the PDSCH scheduled by PDCCH-2. Herein, a value of an HARQ process field in DCI carried by the PDCCH-3 is h, and a value of an NDI field is 1. In this way, when the terminal device receives the PDCCH-1 scrambled by the C-RNTI and does not detect the PDCCH-2 scrambled by the G-RNTI #0, it is possible to avoid the problem that the terminal device mistakenly regards the PDSCH scheduled by the PDCCH-3 scrambled by the C-RNTI as the retransmission of the PDSCH scheduled by previously received PDCCH-1 scrambled by the C-RNTI and further merges the two PDSCHs.

In other embodiments of the present disclosure, the method 300 further includes:

the terminal device expects not to detect a PDCCH scrambled by a G-RNTI in a USS, where the PDCCH scrambled by the G-RNTI is used for indicating a new transmission of one or more TB s.

Since the MBS is sent to multiple UEs, the terminal device expects not to detect the PDCCH scrambled by the G-RNTI that is used for scheduling a new transmission of the MBS and is sent by the network device in the USS.

To sum up, for a HARQ process indicated by the DCI carried in the PDCCH scrambled by the G-RNTI, the terminal device determines whether the PDSCH scheduled by the PDCCH is a new transmission of the MBS according to the change of the RNTI scrambling the PDCCH. For example, if the first PDCCH is scrambled by the first G-RNTI, the HARQ process field in the first PDCCH has the first value, and the PDCCH that is last received and for which the HARQ process field in the DCI has the first value is the second PDCCH, where the second PDCCH is scrambled by the second RNTI, then the terminal device may determine that the first PDCCH is used for scheduling the new transmission of the MBS in a case where the first G-RNTI is different from the second RNTI.

If the terminal device detects a PDCCH scrambled by the C-RNTI in the USS, and if the value of the HARQ process field in the DCI carried by the PDCCH is identical to the value of the HARQ process field in the DCI carried by the PDCCH scrambled by the G-RNTI that is last received and values of the NDI fields in the DCI carried by the two PDCCHs are also identical, then the terminal device considers a PDSCH scheduled by the PDCCH scrambled by the C-RNTI as a retransmission of a PDSCH scheduled by the PDCCH scrambled by the G-RNTI that is last received.

Furthermore, if an HARQ process is used for the unicast service before it is used for the new transmission of the MBS, and the NDI for the PDCCH corresponding to the MBS is not toggled after the HARQ process is used for the MBS, then the terminal device does not expect the network device to schedule the retransmission of the MBS in the PTP manner.

The method embodiments of the present disclosure have been described in detail above with reference to FIG. 3 to FIG. 6. The device embodiments of the present disclosure will be described in detail below with reference to FIG. 7 to FIG. 11. It should be understood that the device embodiments correspond to the method embodiments, and descriptions of the device embodiments that are similar to the method embodiments may refer to the method embodiments.

Figure 7:
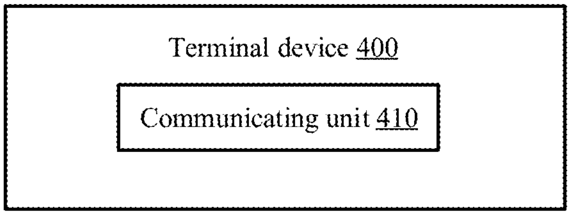
FIG. 7 is a schematic block diagram of a terminal device provided according to an embodiment of the present disclosure.

FIG. 7 shows a schematic block diagram of a terminal device 400 according to an embodiment of the present disclosure. As shown in FIG. 7, the terminal device 400 includes a communicating unit 410.

The communicating unit 410 is configured to detect, in a first search space, a PDCCH scrambled by at least one G-RNTI, where the first search space includes at least one of a CSS or a USS, and a number of types of bit numbers of DCI carried by the PDCCH scrambled by the at least one G-RNTI is less than or equal to a first threshold.

In some embodiments of the present disclosure, a fact that the number of types of the bit numbers of the DCI carried by the PDCCH scrambled by the at least one G-RNTI is less than or equal to the first threshold includes: DCI carried by PDCCHs scrambled by all G-RNTIs detected by the terminal device in the CSS has a same bit number.

In some embodiments of the present disclosure, the bit numbers of the DCI carried by the PDCCHs scrambled by all G-RNTIs detected by the terminal device in the CSS are predefined, or configured by a network device.

In some embodiments of the present disclosure, the bit numbers of the DCI carried by the PDCCHs scrambled by all G-RNTIs detected by the terminal device in the CSS are configured by the network device through Radio Resource Control (RRC) signaling.

In some embodiments of the present disclosure, the DCI carried by the PDCCH scrambled by the at least one G-RNTI includes DCI carried by a PDCCH scrambled by a first G-RNTI.

The DCI carried by the PDCCH scrambled by the first G-RNTI includes a first bit field for indicating a HARQ feedback manner, where a value of the first bit field is an invalid value.

Alternatively, the DCI carried by the PDCCH scrambled by the first G-RNTI does not include first bit field, where an end of the DCI carried by the PDCCH scrambled by the first G-RNTI is a padding bit.

In some embodiments of the present disclosure, a fact that the number of types of the bit numbers of the DCI carried by the PDCCH scrambled by the at least one G-RNTI is less than or equal to the first threshold includes: a number of types of bit numbers of DCI carried by PDCCHs scrambled by all G-RNTIs detected by the terminal device in the CSS is less than or equal to the first threshold value.

In some embodiments of the present disclosure, a bit number of DCI carried by a PDCCH scrambled by each G-RNTI detected by the terminal device in the CSS is predefined, or configured by a network device.

In some embodiments of the present disclosure, a fact that the number of types of the bit numbers of the DCI carried by the PDCCH scrambled by the at least one G-RNTI is less than or equal to the first threshold includes: the DCI carried by PDCCHs scrambled by the G-RNTI detected by the terminal device in the CSS is of a same type; or the terminal device detects, in the CSS, only a first target type of DCI carried by the PDCCHs scrambled by the G-RNTI.

In some embodiments of the present disclosure, the first target type of DCI is a first type of DCI or a second type of DCI, and a bit number of the first type of DCI is less than or equal to a bit number of the second type of DCI.

In some embodiments of the present disclosure, the type of the DCI carried by the PDCCH scrambled by the G-RNTI detected by the terminal device in the CSS is predefined, or configured by a network device.

In some embodiments of the present disclosure, the first target type is configured by the network device through Radio Resource Control (RRC) signaling.

In some embodiments of the present disclosure, a fact that the number of types of the bit numbers of the DCI carried by the PDCCH scrambled by the at least one G-RNTI is less than or equal to the first threshold includes: the terminal device detects, in the USS, only a second target type of DCI carried by PDCCHs scrambled by the G-RNTI.

In some embodiments of the present disclosure, the second target type of DCI is a first type of DCI or a second type of DCI, and a bit number of the first type of DCI is less than or equal to a bit number of the second type of DCI.

In some embodiments of the present disclosure, the type of the DCI carried by the PDCCH scrambled by the G-RNTI detected by the terminal device in the USS is predefined, or configured by a network device.

In some embodiments of the present disclosure, the second target type is configured by the network device through RRC signaling.

In some embodiments of the present disclosure, configuration signaling of the CSS includes a Control Resource Set (CORESET) identity parameter for indicating a CORESET associated with the CSS, a CORESET corresponding to a CORESET identity being within a Common Frequency Resource (CFR).

In some embodiments of the present disclosure, the first threshold is predefined.

Optionally, in some embodiments, the communicating unit may be a communication interface or transceiver or an input-output interface of a communication chip or a system-on-chip. The processing unit may be one or more processors.

It should be understood that the terminal device 400 in the embodiment of the present disclosure may correspond to the terminal device in the method embodiments in the present disclosure, and that each of above operations and other operations and/or functions of the various units in the terminal device 400 is used for implementing the respective flow implemented by the terminal device in the method 200 shown in FIG. 3, which is not repeated herein for the sake of brevity.

Figure 8:
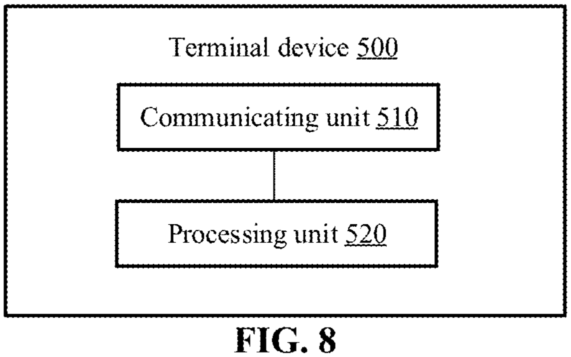
FIG. 8 is another schematic block diagram of a terminal device provided according to an embodiment of the present disclosure.

FIG. 8 is a schematic block diagram of a terminal device according to an embodiment of the present disclosure. The terminal device 500 in FIG. 8 include a communicating unit 510 and a processing unit 520.

The communicating unit 510 is configured to receive, in a first search space, a first Physical Downlink Control Channel (PDCCH) scrambled by a first Radio Network Temporary Identifier (RNTI), where a value of a Hybrid Automatic Repeat reQuest (HARQ) process field in Downlink Control Information (DCI) carried by the first PDCCH is a first value, and a second PDCCH is a PDCCH that is last received by the terminal device and for which the HARQ process field in the DCI has the first value.

The processing unit 520 is configured to determine whether a Physical Downlink Shared Channel (PDSCH) scheduled by the first PDCCH is a retransmission of a PDSCH scheduled by the second PDCCH according to at least one of: the first search space, a search space in which the second PDCCH is received, the first RNTI, an RNTI scrambling the second PDCCH, a value of a New Data Indicator (NDI) field in the DCI carried by the first PDCCH or a value of an NDI field in DCI carried by the second PDCCH.

In some embodiments of the present disclosure, the processing unit 520 is further configured to:

determine that the PDSCH scheduled by the first PDCCH is a new transmission of a Multicast Broadcast Service (MBS) in a case where following conditions are satisfied.

The first search space is a Common Search Space (CSS).

The first RNTI is a first Group Radio Network Temporary Identifier (G-RNTI).

The second PDCCH is scrambled by a second RNTI, where the second RNTI is different from the first G-RNTI.

In some embodiments of the present disclosure, the processing unit 520 is further configured to determine that the PDSCH scheduled by the first PDCCH is the retransmission of the PDSCH scheduled by the second PDCCH in a case where following conditions are satisfied.

The first search space is a User Equipment (UE) specific Search Space (USS).

The first RNTI is a first Cell Radio Network Temporary Identifier (C-RNTI).

The second PDCCH is scrambled by a second G-RNTI.

The value of the NDI field in the DCI carried by the first PDCCH is identical to the value of the NDI field in the DCI carried by the second PDCCH.

In some embodiments of the present disclosure, the processing unit 520 is further configured to:

expect not to receive a first target PDCCH scrambled by a C-RNTI in a USS, where the first target PDCCH satisfies following conditions.

PDSCHs scheduled by the first target PDCCH are retransmission of PDSCHs scheduled by K PDCCHs previously received by the terminal device, where the K PDCCHs are scrambled by a third G-RNTI, and K is less than or equal to N, where N is a positive integer The value of an HARQ process field in DCI carried by the first target PDCCH is the first value, and a value of an HARQ process field in DCI carried by the K PDCCHs is also the first value.

The value of an NDI field in the DCI carried by the first target PDCCH is a second value, and a value of an NDI field in DCI carried by the K PDCCHs is also the second value.

An HARQ process number having the first value is used for a unicast transmission before being used for sending the K PDCCHs scrambled by the third G-RNTI.

In some embodiments of the present disclosure, the processing unit 520 is further configured to:

expect not to receive a second target PDCCH scrambled by a C-RNTI in a USS, where the second target PDCCH satisfies the following conditions.

PDSCHs scheduled by the second target PDCCH are retransmission of PDSCHs scheduled by K PDCCHs previously received by the terminal device, where the K PDCCHs are scrambled by a fourth G-RNTI, and K is less than or equal to N, where N is a positive integer.

A value of an HARQ process field in DCI carried by the second target PDCCH is the first value, and a value of an HARQ process field in DCI carried by the K PDCCHs is also the first value.

A value of an NDI field in the DCI carried by the second target PDCCH is a second value, and a value of an NDI field in DCI carried by the K PDCCHs is also the second value.

The terminal device does not send HARQ feedback information for the PDSCHs scheduled by the K PDCCHs scrambled by the fourth G-RNTI on Physical Uplink Control Channel (PUCCH) resources indicated by the K PDCCHs scrambled by the fourth G-RNTI.

The HARQ process number having the first value is used for a unicast transmission before being used for sending the K PDCCHs scrambled by the fourth G-RNTI.

In some embodiments of the present disclosure, N is a predefined value or is configured by a network device.

In some embodiments of the present disclosure, the processing unit 520 is further configured to:

expect not to detect a PDCCH scrambled by a G-RNTI in a USS, where the PDCCH scrambled by the G-RNTI is used for indicating a new transmission of one or more Transport Blocks (TBs).

Optionally, in some embodiments, the communicating unit may be a communication interface or transceiver or an input-output interface of a communication chip or a system-on-chip. The processing unit may be one or more processors.

It should be understood that the terminal device 500 in the embodiment of the present disclosure may correspond to the terminal device in the method embodiments in the present disclosure, and that each of above operations and other operations and/or functions of the various units in the terminal device 500 is used for implementing the respective flow implemented by the terminal device in the method 300 shown in FIG. 4 to FIG. 6, which is not repeated herein for the sake of brevity.

Figure 9:
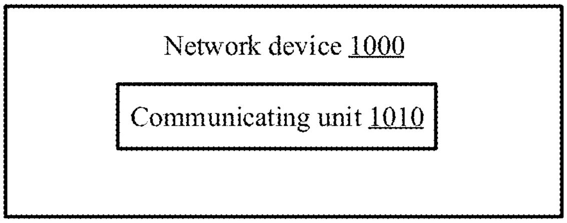
FIG. 9 is a schematic block diagram of a network device provided according to an embodiment of the present disclosure.

FIG. 9 is a schematic block diagram of a network device according to an embodiment of the present disclosure. The network device 1000 in FIG. 9 includes a communicating unit 1010.

The communicating unit 1010 is configured to send, in a first search space, a Physical Downlink Control Channel (PDCCH) scrambled by at least one Group Radio Network Temporary Identifier (G-RNTI), where the first search space includes at least one of a Common Search Space (CS S) or a User Equipment (UE) specific Search Space (USS), and a number of types of bit numbers of Downlink Control Information (DCI) carried by the PDCCH scrambled by the at least one G-RNTI is less than or equal to a first threshold.

In some embodiments of the present disclosure, a fact that the number of types of the bit numbers of the DCI carried by the PDCCH scrambled by the at least one G-RNTI is less than or equal to the first threshold includes:

the DCI carried by PDCCHs scrambled by all G-RNTIs sent by the network device in the CSS has a same bit number.

In some embodiments of the present disclosure, the DCI carried by the PDCCHs scrambled by all G-RNTIs sent by the network device in the CSS has a first bit number, and the network device further includes a processing unit.

The processing unit is configured to: in a case where a bit number of DCI carried by a PDCCH scrambled by a first G-RNTI is less than the first bit number, add a padding bit at an end of the DCI carried by the PDCCH scrambled by the first G-RNTI to enable the bit number of the DCI to be equal to the first bit number; or add a first bit field in the DCI carried by the PDCCH scrambled by the first G-RNTI, where a value of the first bit field is an invalid value to enable the bit number of the DCI to be equal to the first bit number.

In some embodiments of the present disclosure, the first bit field is used for indicating a Hybrid Automatic Repeat reQuest (HARD) feedback manner.

In some embodiments of the present disclosure, the bit numbers of the DCI carried by the PDCCHs scrambled by all G-RNTIs sent by the network device in the CSS are predefined or configured by the network device.

In some embodiments of the present disclosure, a fact that the number of types of the bit numbers of the DCI carried by the PDCCH scrambled by the at least one G-RNTI is less than or equal to the first threshold includes:

a number of types of bit numbers of DCI carried by PDCCHs scrambled by all G-RNTIs sent by the network device in the CSS is less than or equal to the first threshold value.

In some embodiments of the present disclosure, a bit number of DCI carried by a PDCCH scrambled by each G-RNTI sent by the network device in the CSS is predefined, or configured by the network device.

In some embodiments of the present disclosure, a fact that the number of types of the bit numbers of the DCI carried by the PDCCH scrambled by the at least one G-RNTI is less than or equal to the first threshold includes:

the network device sends, in the CSS, only a first target type of DCI carried by the PDCCHs scrambled by the G-RNTI.

In some embodiments of the present disclosure, the first target type of DCI is a first type of DCI or a second type of DCI, and a bit number of the first type of DCI is less than a bit number of the second type of DCI.

In some embodiments of the present disclosure, the type of the DCI carried by the PDCCH scrambled by the G-RNTI sent by the network device in the CSS is predefined, or configured by the network device.

In some embodiments of the present disclosure, the first target type is configured by the network device through RRC signaling.

In some embodiments of the present disclosure, a fact that the number of types of the bit numbers of the DCI carried by the PDCCH scrambled by the at least one G-RNTI is less than or equal to the first threshold includes:

the network device sends, in the USS, only a second target type of DCI carried by the PDCCHs scrambled by the G-RNTI.

In some embodiments of the present disclosure, the second target type of DCI is a first type of DCI or a second type of DCI, and a bit number of the first type of DCI is less than a bit number of the second type of DCI.

In some embodiments of the present disclosure, the type of the DCI carried by the PDCCH scrambled by the G-RNTI sent by the network device in the USS is predefined, or configured by the network device.

In some embodiments of the present disclosure, the second target type is configured by the network device through RRC signaling.

In some embodiments of the present disclosure, configuration signaling of the CSS includes a Control Resource Set (CORESET) identity parameter for indicating a CORESET associated with the CSS, a CORESET corresponding to a CORESET identity being within a Common Frequency Resource (CFR).

In some embodiments of the present disclosure, the first threshold is predefined.

Optionally in some embodiments, the communicating unit may be a communication interface or transceiver or an input-output interface of a communication chip or a system-on-chip. The processing unit may be one or more processors.

It should be understood that the network device 1000 in the embodiment of the present disclosure may correspond to the network device in the method embodiments in the present disclosure, and that each of above operations and other operations and/or functions of the various units in the network device 1000 is used for implementing the respective flow implemented by the terminal device in the method 200 shown in FIG. 3, which is not repeated herein for the sake of brevity.

Figure 10:
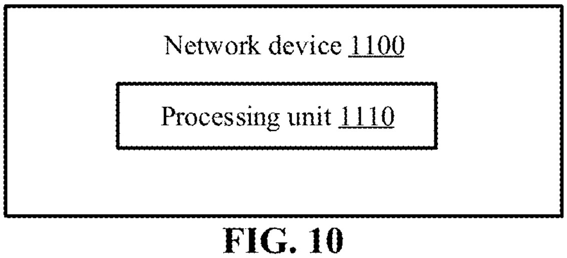
FIG. 10 is another schematic block diagram of a network device provided according to an embodiment of the present disclosure.

FIG. 10 is a schematic block diagram of a network device according to an embodiment of the present disclosure. The network device 1100 in FIG. 10 includes a processing unit 1110.

The processing unit 1110 is configured to schedule a retransmission of a Multicast Broadcast Service (MBS) by not using a PTP manner in a case where a value of a New Data Indicator (NDI) field in a first Physical Downlink Control Channel (PDCCH) is identical to a value of an NDI field in a second PDCCH, where the first PDCCH is used for scheduling an initial transmission of the MBS and the second PDCCH is used for scheduling a unicast service, a value of a Hybrid Automatic Repeat reQuest (HARQ) process field in the first PDCCH is identical to a value of an HARQ process field in the second PDCCH.

In some embodiments of the present disclosure, the network device 1100 further includes a communicating unit.

The communicating unit is configured not to receive a first target PDCCH scrambled by a Cell Radio Network Temporary Identifier (C-RNTI) in a User Equipment (UE) specific Search Space (USS), where the first target PDCCH satisfies following conditions.

PDSCHs scheduled by the first target PDCCH are retransmission of PDSCHs scheduled by K PDCCHs previously received by the terminal device, where the K PDCCHs are scrambled by a third G-RNTI, and K is less than or equal to N, where N is a positive integer.

A value of an HARQ process field in DCI carried by the first target PDCCH is the first value, and a value of an HARQ process field in DCI carried by the K PDCCHs is also the first value.

A value of an NDI field in the DCI carried by the first target PDCCH is a second value, and a value of an NDI field in DCI carried by the K PDCCHs is also the second value.

An HARQ process number having the first value is used for a unicast transmission before being used for sending the K PDCCHs scrambled by the third G-RNTI.

In some embodiments of the present disclosure, the network device 1100 further includes a communicating unit.

The communicating unit is configured not to receive a second target PDCCH scrambled by a C-RNTI in a USS, where the second target PDCCH satisfies following conditions.

PDSCHs scheduled by the second target PDCCH are retransmission of PDSCHs scheduled by K PDCCHs previously received by the terminal device, where the K PDCCHs are scrambled by a fourth G-RNTI, and K is less than or equal to N, where N is a positive integer.

A value of an HARQ process field in DCI carried by the second target PDCCH is the first value, and a value of an HARQ process field in DCI carried by the K PDCCHs is also the first value.

A value of an NDI field in the DCI carried by the second target PDCCH is a second value, and a value of an NDI field in DCI carried by the K PDCCHs is also the second value.

The terminal device does not send HARQ feedback information for the PDSCHs scheduled by the K PDCCHs scrambled by the fourth G-RNTI on Physical Uplink Control Channel (PUCCH) resources indicated by the K PDCCHs scrambled by the fourth G-RNTI.

An HARQ process number having the first value is used for a unicast transmission before being used for sending the K PDCCHs scrambled by the fourth G-RNTI.

In some embodiments of the present disclosure, N is a predefined value or is configured by a network device.

In some embodiments of the present disclosure, the network device 1100 further includes a communicating unit.

The communicating unit is configured not to send a PDCCH scrambled by a G-RNTI in the USS, where the PDCCH is used for indicating a new transmission of one or more Transport Blocks (TBs).

Optionally, in some embodiments, the communicating unit may be a communication interface or transceiver or an input-output interface of a communication chip or a system-on-chip. The processing unit may be one or more processors.

It should be understood that the network device 1100 in the embodiment of the present disclosure may correspond to the network device in the method embodiments in the present disclosure, and that each of above operations and other operations and/or functions of the various units in the network device 1100 is used for implementing the respective flow implemented by the network device in the method 300 shown in FIG. 4 to FIG. 6, which is not repeated herein for the sake of brevity.

Figure 11:
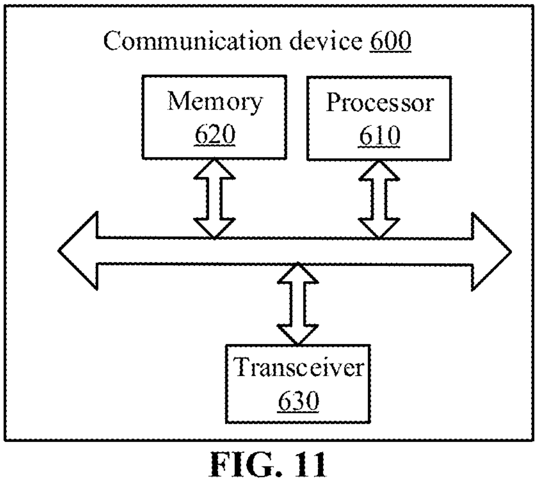
FIG. 11 is a schematic block diagram of a communication device provided according to an embodiment of the present disclosure.

FIG. 11 is a schematic structural diagram of a communication device 600 according to an embodiment of the present disclosure. The communication device 600 shown in FIG. 11 includes a processor 610 that may invoke and run a computer program from a memory to implement the method in the embodiment of the present disclosure.

Optionally, as shown in FIG. 11, the communication device 600 may also include a memory 620. The processor 610 may invoke and run a computer program from the memory 620 to implement the method in the embodiment of the present disclosure.

The memory 620 may be a separate device independent of or the memory 620 may be integrated into the processor 610.

Optionally, as shown in FIG. 11, the communication device 600 may also include a transceiver 630. The processor 610 may control the transceiver 630 to communicate with other devices, in particular, to send information or data to other devices, or receive information or data sent by other devices.

The transceiver 630 may include a transmitter and a receiver. The transceiver 630 may further include an antenna (s), the number of which may be one or more.

Optionally, the communication device 600 may be specifically a network device in the embodiments of the present disclosure, and the communication device 600 may implement the corresponding process implemented by the network device in each method of the embodiments of the present disclosure, which will not be repeated herein for the sake of brevity.

Optionally, the communication device 600 may be a mobile terminal/terminal device according to the embodiments of the present disclosure, and the communication device 600 may implement the corresponding flow implemented by the mobile terminal/terminal device in each method of the embodiments of the present disclosure, which will not be repeated herein for the sake of brevity.

Figure 12:
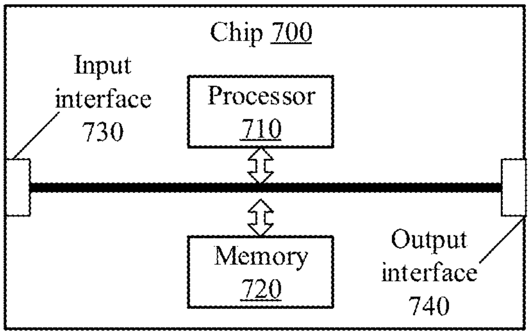
FIG. 12 is a schematic block diagram of a chip provided according to an embodiment of the present disclosure.

FIG. 12 is a schematic structural diagram of a chip according to an embodiment of the present disclosure. The chip 700 shown in FIG. 12 includes a processor 710 that may invoke and run a computer program from a memory to implement the method in the embodiment of the present disclosure.

Optionally, as shown in FIG. 12, the chip 700 may also include a memory 720. The processor 710 may invoke and run a computer program from the memory 720 to implement the method in the embodiment of the present disclosure.

The memory 720 may be a separate device independent of the processor 710 or the memory 720 may be integrated in the processor 710.

Optionally, the chip 700 may also include an input interface 730. The processor 710 may control the input interface 730 to communicate with other devices or chips, and in particular may obtain information or data sent by other devices or chips.

Optionally, the chip 700 may also include an output interface 740. The processor 710 may control the output interface 740 to communicate with other devices or chips, and in particular may output information or data to other devices or chips.

Optionally, the chip may be applied to the network device in the embodiments of the present disclosure, and the chip may implement the corresponding process implemented by the network device in each method of the embodiments of the disclosure, which is not repeated herein for the sake of brevity.

Optionally, the chip may be applied to the mobile terminal/terminal device in the embodiments of the present disclosure, and the chip may implement the corresponding flow implemented by the mobile terminal/terminal device in each method of the embodiment of the disclosure. For the sake of simplicity, which will not be repeated herein for the sake of brevity.

It should be understood that chips mentioned in the embodiments of the present disclosure may also be referred to as system level chips, system chips, chip systems or on-chip system chips, etc.

Figure 13:
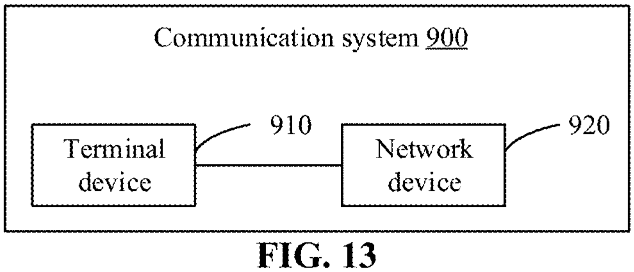
FIG. 13 is a schematic block diagram of a communication system provided according to an embodiment of the present disclosure.

FIG. 13 is a schematic block diagram of a communication system 900 according to an embodiment of the present disclosure. As shown in FIG. 13, the communication system 900 includes a terminal device 910 and a network device 920.

The terminal device 910 may be configured to implement the corresponding functions implemented by the terminal device in the above method, and the network device 920 may be configured to implement the corresponding functions implemented by the network device in the above method, which will not be repeated herein for the sake of brevity.

It should be understood that the processor of the embodiments of the disclosure may be an integrated circuit chip with signal processing capacity. In an implementation process, various steps of the above method embodiments may be completed by an integrated logic circuit of hardware in the processor or an instruction in the form of software. The above processor may be a general-purpose processor, a Digital Signal Processor (DSP), an Application Specific Integrated Circuit (ASIC), a Field Programmable Gate Array (FPGA), or other programmable logic devices, discrete gate or transistor logic devices, and discrete hardware components. Various methods, steps, and logical block diagrams disclosed in the embodiments of the disclosure may be implemented or performed. The general-purpose processor may be a microprocessor, any conventional processor, or the like. Steps of the methods disclosed with reference to the embodiments of the disclosure may be directly performed and accomplished by a hardware decoding processor, or may be performed and accomplished by a combination of hardware and software modules in the decoding processor. The software module may be located in a storage medium mature in the art, such as a random access memory, a flash memory, a read-only memory, a programmable read-only memory or electrically erasable programmable memory, or a register. The storage medium is located in the memory, and the processor reads information in the memory and completes the steps in the foregoing methods in combination with hardware of the processor.

It may be understood that the memory in the embodiments of the disclosure may be a volatile memory or a nonvolatile memory, or may include a volatile memory and a nonvolatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a RAM, which is used as an external high-speed cache. By way of example but not restrictive description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory of the systems and methods described in this specification includes but is not limited to these and any other proper types of memories.

It should be understood that the abovementioned memories are exemplary but not restrictive, for example, the memory in the embodiments of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), and a Direct Rambus RAM (DR RAM). That is to say, the memories described in the embodiment of the disclosure are intended to include, but not limited to, these and any other suitable types of memories.

The embodiments of the disclosure further provide a computer-readable storage medium, which is configured to store a computer program.

Optionally, the computer-readable storage medium may be applied to a network device in the embodiments of the disclosure. The computer program enables a computer to execute corresponding flows implemented by the network device in each method of the embodiments of the disclosure, which will not be elaborated here for simplicity.

Optionally, the computer-readable storage medium may be applied to a mobile terminal/a terminal device in the embodiments of the disclosure. The computer program enables a computer to execute corresponding flows implemented by the mobile terminal/the terminal device in each method of the embodiments of the disclosure, which will not be elaborated here for simplicity.

The embodiments of the disclosure further provide a computer program product, which includes a computer program instruction.

Optionally, the computer program product may be applied to a network device in the embodiments of the disclosure. The computer program instruction enables a computer to execute corresponding flows implemented by the network device in each method of the embodiments of the disclosure, which will not be elaborated here for simplicity.

Optionally, the computer program product may be applied to a mobile terminal/a terminal device in the embodiments of the disclosure. The computer program instruction enables a computer to execute corresponding flows implemented by the mobile terminal/the terminal device in each method of the embodiments of the disclosure, which will not be elaborated here for simplicity.

The embodiments of the disclosure further provide a computer program.

Optionally, the computer program may be applied to a network device in the embodiments of the disclosure. The computer program runs in a computer to enable the computer to execute corresponding flows implemented by the network device in each method of the embodiments of the disclosure, which will not be elaborated here for simplicity.

Optionally, the computer program may be applied to a mobile terminal/a terminal device in the embodiments of the disclosure. When running on a computer, the computer program enables a computer to execute corresponding flows implemented by the mobile terminal/the terminal device in each method of the embodiments of the disclosure, which will not be elaborated here for simplicity.

Those of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may realize the described functions for each particular disclosure by different methods, but it is not be considered that the implementation is beyond the scope of the disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in the disclosure, it should be understood that the disclosed system, apparatus, and method may be implemented in other modes. For example, the apparatus embodiment described above is only schematic, and for example, division of the units is only logic function division, and other division manners may be adopted during practical implementation. For example, a plurality of units or components may be combined or integrated into another system, or some characteristics may be neglected or not executed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in various embodiments of the disclosure may be integrated into one processing unit, or each of the units may be physically separated, or two or more units may be integrated into one unit.

When the functions are realized in a form of a software functional unit and sold or used as an independent product, they may be stored in a computer-readable storage medium. Based on this understanding, the technical solutions of the embodiments of the disclosure essentially or the parts that contribute to the prior art, or part of the technical solutions can be embodied in the form of a software product. The computer software product is stored in a storage medium, including a plurality of instructions for causing a computer device (which may be a personal computer, a server, or a network device, and the like) to execute all or part of the steps of the method described in the embodiments of the disclosure. The foregoing storage medium includes a USB flash disk, a mobile hard disk drive, a ROM, a RAM, and various media that can store program codes, such as a magnetic disk or an optical disk.

The above descriptions are merely specific implementations of the disclosure, but are not intended to limit the scope of protection of the disclosure. Any variation or replacement readily figured out by a person skilled in the art within the technical scope disclosed in the disclosure shall fall within the scope of protection of the disclosure. Therefore, the scope of protection of the disclosure shall be subject to the scope of protection of the claims.

The invention claimed is:

1. A method for wireless communication, comprising:
detecting, by a terminal device in a first search space, a Physical Downlink Control Channel (PDCCH) scrambled by at least one Group Radio Network Temporary Identifier (G-RNTI), wherein the first search space comprises at least one of a Common Search Space (CSS) or a User Equipment (UE) specific Search Space (USS), and a number of types of bit numbers of Downlink Control Information (DCI) carried by the PDCCH scrambled by the at least one G-RNTI is less than or equal to a first threshold,
wherein the number of types of the bit numbers of the DCI carried by the PDCCH scrambled by the at least one G-RNTI being less than or equal to the first threshold comprises that bit numbers of DCI carried by PDCCHs scrambled by all G-RNTIs detected by the terminal device in the CSS are the same.

2. The method of claim 1, wherein the bit numbers of the DCI carried by the PDCCHs scrambled by all G-RNTIs detected by the terminal device in the CSS are configured by the network device through Radio Resource Control (RRC) signaling.

3. The method of claim 1, wherein the DCI carried by the PDCCH scrambled by the at least one G-RNTI comprises DCI carried by a PDCCH scrambled by a first G-RNTI,
the DCI carried by the PDCCH scrambled by the first G-RNTI comprising a first bit field for indicating a Hybrid Automatic Repeat reQuest (HARQ) feedback manner, or
the DCI carried by the PDCCH scrambled by the first G-RNTI comprising no first bit field, and an end of the DCI carried by the PDCCH scrambled by the first G-RNTI being a padding bit.

4. The method of claim 1, wherein the number of types of the bit numbers of the DCI carried by the PDCCH scrambled by the at least one G-RNTI being less than or equal to the first threshold further comprises that:
the DCI carried by PDCCHs scrambled by the G-RNTI detected by the terminal device in the CSS is of a same type; or
the terminal device detects, in the CSS, only a first target type of DCI carried by the PDCCHs scrambled by the G-RNTI.

5. The method of claim 4, wherein the first target type of DCI is a first type of DCI or a second type of DCI, a bit number of the first type of DCI being less than or equal to a bit number of the second type of DCI.

6. The method of claim 4, wherein the first target type is configured by the network device through RRC signaling.

7. A method for wireless communication, comprising:
sending, by a network device in a first search space, a Physical Downlink Control Channel (PDCCH) scrambled by at least one Group Radio Network Temporary Identifier (G-RNTI), wherein the first search space comprises at least one of a Common Search Space (CSS) or a User Equipment (UE) specific Search Space (USS), and a number of types of bit numbers of Downlink Control Information (DCI) carried by the PDCCH scrambled by the at least one G-RNTI is less than or equal to a first threshold,
the number of types of the bit numbers of the DCI carried by the PDCCH scrambled by the at least one G-RNTI being less than or equal to the first threshold comprises that bit numbers of DCI carried by PDCCHs scrambled by all G-RNTIs sent by the network device in the CSS are the same.

8. The method of claim 7, wherein the bit numbers of the DCI carried by the PDCCHs scrambled by all G-RNTIs sent by the network device in the CSS are configured by the network device through Radio Resource Control (RRC) signaling.

9. The method of claim 7, wherein the number of types of the bit numbers of the DCI carried by the PDCCH scrambled by the at least one G-RNTI being less than or equal to the first threshold further comprises that:

a number of types of bit numbers of DCI carried by PDCCHs scrambled by all G-RNTIs sent by the network device in the CSS is less than or equal to the first threshold value.

10. The method of claim 9, wherein a bit number of DCI carried by a PDCCH scrambled by each G-RNTI sent by the network device in the CSS is predefined, or configured by the network device.

11. The method of claim 7, wherein configuration signaling of the CSS comprises a Control Resource Set (CORESET) identity parameter for indicating a CORESET associated with the CSS, a CORESET corresponding to a CORESET identity being within a Common Frequency Resource (CFR).

12. The method of claim 7, wherein the first threshold is predefined.

13. A terminal device, comprising a processor and a memory configured to store computer-executable instructions, wherein the processor is configured to invoke and run the computer-executable instructions stored in the memory to perform:

detecting, in a first search space, a Physical Downlink Control Channel (PDCCH) scrambled by at least one Group Radio Network Temporary Identifier (G-RNTI), wherein the first search space comprises at least one of a Common Search Space (CSS) or a User Equipment (UE) specific Search Space (USS), and a number of types of bit numbers of Downlink Control Information (DCI) carried by the PDCCH scrambled by the at least one G-RNTI is less than or equal to a first threshold, wherein the number of types of the bit numbers of the DCI carried by the PDCCH scrambled by the at least one G-RNTI being less than or equal to the first threshold comprises that bit numbers of DCI carried by PDCCHs scrambled by all G-RNTIs detected by the terminal device in the CSS are the same.

14. The terminal device of claim 13, wherein the bit numbers of the DCI carried by the PDCCHs scrambled by all G-RNTIs detected by the terminal device in the CSS are configured by the network device through Radio Resource Control (RRC) signaling.

15. The terminal device of claim 13, wherein the DCI carried by the PDCCH scrambled by the at least one G-RNTI comprises DCI carried by a PDCCH scrambled by a first G-RNTI, the DCI carried by the PDCCH scrambled by the first G-RNTI comprising a first bit field for indicating a Hybrid Automatic Repeat reQuest (HARQ) feedback manner, or the DCI carried by the PDCCH scrambled by the first G-RNTI comprising no first bit field, and an end of the DCI carried by the PDCCH scrambled by the first G-RNTI being a padding bit.

16. The terminal device of claim 13, wherein number of types of the bit numbers of the DCI carried by the PDCCH scrambled by the at least one G-RNTI being less than or equal to the first threshold further comprises that the DCI carried by PDCCHs scrambled by the G-RNTI detected by the terminal device in the CSS is of a same type; or the terminal device detects, in the CSS, only a first target type of DCI carried by the PDCCHs scrambled by the G-RNTI.

17. The terminal device of claim 16, wherein the first target type of DCI is a first type of DCI or a second type of DCI, a bit number of the first type of DCI being less than or equal to a bit number of the second type of DCI.

18. The terminal device of claim 16, wherein the first target type is configured by the network device through RRC signaling.

19. A non-transitory computer-readable storage medium, configured to store computer-executable instructions that cause a computer to perform the method of claim 1.

20. A network device, comprising a processor and a memory configured to store computer-executable instructions, wherein the processor is configured to invoke and run the computer-executable instructions stored in the memory to perform the method of claim 7.

* * * * *